(12) United States Patent
Klaus et al.

(10) Patent No.: US 8,492,019 B2
(45) Date of Patent: Jul. 23, 2013

(54) EXTRUDED THERMAL FIN FOR TEMPERATURE CONTROL OF BATTERY CELLS

(75) Inventors: Philip Klaus, Heidesheim (DE); Reiner Essinger, Lautertal (DE)

(73) Assignee: GM Global Technology Operations LLC, Detroit, MI (US)

( * ) Notice: Subject to any disclaimer, the term of this patent is extended or adjusted under 35 U.S.C. 154(b) by 361 days.

(21) Appl. No.: 12/857,751

(22) Filed: Aug. 17, 2010

(65) Prior Publication Data

US 2012/0045681 A1 Feb. 23, 2012

(51) Int. Cl.
*H01M 10/50* (2006.01)

(52) U.S. Cl.
USPC ........................................................ 429/120

(58) Field of Classification Search
USPC ............... 429/120, 247, 50, 148, 151, 153
See application file for complete search history.

(56) References Cited

U.S. PATENT DOCUMENTS

| | | | |
|---|---|---|---|
| 6,512,347 B1 * | 1/2003 | Hellmann et al. ............ | 320/107 |
| 7,264,901 B2 * | 9/2007 | Gow et al. ..................... | 429/120 |
| 7,794,871 B2 * | 9/2010 | Kim ............................. | 429/159 |
| 8,383,260 B2 * | 2/2013 | Essinger et al. ............... | 429/120 |
| 2003/0232239 A1 * | 12/2003 | Gow et al. ..................... | 429/120 |
| 2008/0248379 A1 * | 10/2008 | Takeuchi et al. .............. | 429/120 |
| 2008/0299448 A1 * | 12/2008 | Buck et al. .................... | 429/120 |
| 2010/0236854 A1 * | 9/2010 | Nakamura ..................... | 180/68.5 |
| 2011/0212355 A1 * | 9/2011 | Essinger et al. ............... | 429/120 |
| 2011/0262791 A1 * | 10/2011 | Im et al. ........................ | 429/120 |
| 2011/0293982 A1 * | 12/2011 | Martz et al. ................... | 429/120 |
| 2011/0318626 A1 * | 12/2011 | Bartenschlager ............. | 429/120 |
| 2012/0028098 A1 * | 2/2012 | Meehan et al. ................ | 429/120 |
| 2012/0040222 A1 * | 2/2012 | Quick et al. ................... | 429/120 |
| 2012/0040223 A1 * | 2/2012 | Odumodu ...................... | 429/120 |
| 2012/0107649 A1 * | 5/2012 | Anderson et al. ............. | 429/50 |
| 2012/0208064 A1 * | 8/2012 | Murata et al. ................. | 429/120 |
| 2012/0214041 A1 * | 8/2012 | Harada et al. ................. | 429/120 |

* cited by examiner

*Primary Examiner* — Yogendra Gupta
*Assistant Examiner* — Emmanuel S Luk
(74) *Attorney, Agent, or Firm* — Fraser Clemens Martin & Miller LLC; J. Douglas Miller

(57) ABSTRACT

A thermal management system for a battery pack includes a plurality of main bodies disposed in a stack, an inlet conduit and an outlet conduit in fluid communication with the plurality of main bodies, and a retention panel coupled to the plurality of main bodies. The main bodies include a thermal fin and conduit and are formed using an extrusion process, which minimizes a weight of the thermal fin and heat sink while minimizing a cost of the thermal management system.

20 Claims, 4 Drawing Sheets

EXTRUDED THERMAL FIN FOR TEMPERATURE CONTROL OF BATTERY CELLS

FIELD OF THE INVENTION

The present disclosure relates to a battery pack and more particularly to a thermal management system for a battery pack.

BACKGROUND OF THE INVENTION

A battery cell has been proposed as a clean, efficient and environmentally responsible power source for an electric device such as an electric vehicle, for example. One type of battery cell is a lithium-ion battery cell. Typically, a plurality of individual lithium-ion battery cells is provided in a stacked configuration to supply an amount of electric power sufficient to operate the electric device.

The lithium-ion battery cells are known to generate heat during a charging and a discharging thereof. When overheated or otherwise exposed to high-temperature environments, the heat can impact the operation of the lithium-ion battery cells. A thermal management system is typically employed with the lithium-ion battery cells, as well as other types of battery cells, to militate against undesirable temperature conditions.

Moreover, as the lithium-ion battery cells charge and are discharged, they may expand, wherein such expansion is commonly known as battery cell swell. Battery cell swell can cause a change in a height of the stack of lithium-ion battery cells and to a compressive force being applied to the individual lithium-ion battery cells. Typically, a battery cell assembly includes a compressible component such as a foam layer disposed between adjacent battery cells, for example, to accommodate battery cell swell and maintain a desired height of the stack of the lithium-ion battery cells and a desired compressive force applied to the individual lithium-ion battery cells. Further, the compressible component also facilitates an accommodation of dimensional tolerances of the components of the battery pack assembly.

When such thermal management systems employ a fluid in a closed circuit as a medium for heat transfer, a complexity of the thermal management system is undesirably increased. A plurality of seals must be employed and maintained between a plurality of components of the thermal management system employing the fluid. Further, as a result of the plurality of seals and the plurality of components, a pressure loss through the system is increased, resulting in inefficient heat transfer to or from the battery pack.

To provide such thermal management systems and compressible components, a complexity of the battery pack assembly is undesirably increased. A plurality of machined or injection molded components forms at least a portion of the battery pack assembly. Accordingly, a cost of the battery pack assembly is undesirably increased.

It is desirable to produce a thermal management system for a battery pack having a thermal fin and a conduit, wherein the thermal fin and the conduit are formed using an extrusion process and a weight and a cost of the thermal management system are minimized.

SUMMARY OF THE INVENTION

Presently provided by the invention, a thermal management system for a battery pack having a thermal fin and a conduit, wherein the thermal fin and the conduit are formed using an extrusion process and a weight and a cost of the thermal management system are minimized, has been surprisingly discovered.

In one embodiment, a thermal management system for a battery pack comprises at least one battery cell; and a main body having a battery cell retention area formed between a plurality of thermal fins and a first conduit in fluid communication with a source of a fluid, the first conduit in thermal communication with the thermal fins, wherein the at least one battery cell is received in the battery cell retention area to place the thermal fins in thermal communication with the at least one battery cell, and wherein the fluid is caused to flow through the first conduit and cooperates with the first conduit and the thermal fins to regulate a temperature of the at least one battery cell.

In another embodiment, a thermal management system for a battery pack comprises a plurality of battery cells; a plurality of main bodies disposed in a stack, each of the main bodies having a pair of battery cell retention areas formed therein between a plurality of thermal fins, a first conduit in thermal communication with the thermal fins, and a second conduit in thermal communication with the thermal fins, wherein the battery cells are received in the battery cell retention areas to place the thermal fins in thermal communication with the battery cells; an inlet conduit providing fluid communication between at least one of the first conduits and a source of fluid; an outlet conduit providing fluid communication between at least one of the second conduits and the source of fluid; and a plurality of transfer conduits, one of the transfer conduits disposed between the first conduit and the second conduit of the main bodies to provide fluid communication between the first conduit and the second conduit, wherein the fluid is caused to flow from the source of fluid through the inlet conduit, the at least one of the first conduits, the transfer conduit, the at least one of the second conduits, the outlet conduit, and to the source of fluid, the fluid cooperating with the at least one of the first conduits, the at least one of the second conduits, and the thermal fins to regulate a temperature of the battery cells.

In another embodiment, a thermal management system for a battery pack comprises a plurality of battery cells; a plurality of extruded main bodies disposed in a stack, each of the main bodies having a pair of battery cell retention areas formed therein between a plurality of thermal fins, a first conduit in thermal communication with the thermal fins, and a second conduit in thermal communication with the thermal fins, wherein the first conduit and the second conduit of each of the main bodies are integrally formed with the thermal fins thereof, and wherein the battery cells are received in the battery cell retention areas to place the thermal fins in thermal communication with the battery cells; a swell compensation unit disposed between each of the main bodies; an inlet conduit providing fluid communication between at least one of the first conduits and a source of fluid; an outlet conduit providing fluid communication between at least one of the second conduits and the source of fluid; and a plurality of transfer conduits, one of the transfer conduits disposed between the first conduit and the second conduit of the main bodies to provide fluid communication between the first conduit and the second conduit, wherein the fluid is caused to flow from the source of fluid through the inlet conduit, the at least one of the first conduits, the transfer conduit, the at least one of the second conduits, the outlet conduit, and to the source of fluid, the fluid cooperating with the at least one of the first conduits, the at least one of the second conduits, and the thermal fins to regulate a temperature of the battery cells

BRIEF DESCRIPTION OF THE DRAWINGS

The above, as well as other advantages of the present invention, will become readily apparent to those skilled in the art from the following detailed description, particularly when considered in the light of the drawings described herein.

Figure 1:
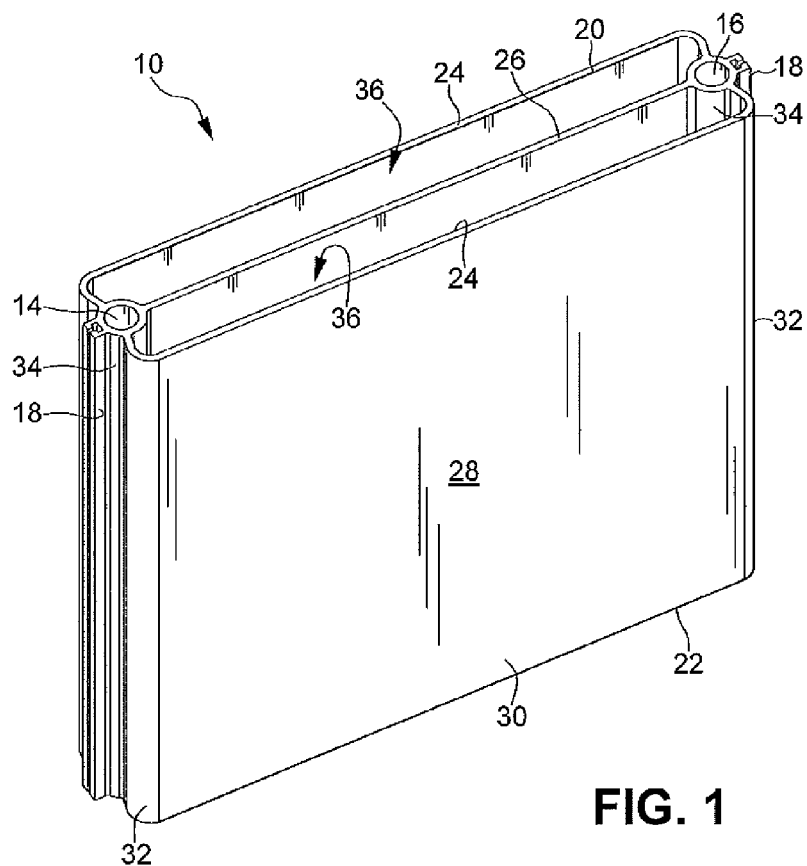
FIG. 1 is a perspective view of a main body which forms a portion of a battery pack assembly according to the present disclosure.
Figure 4:
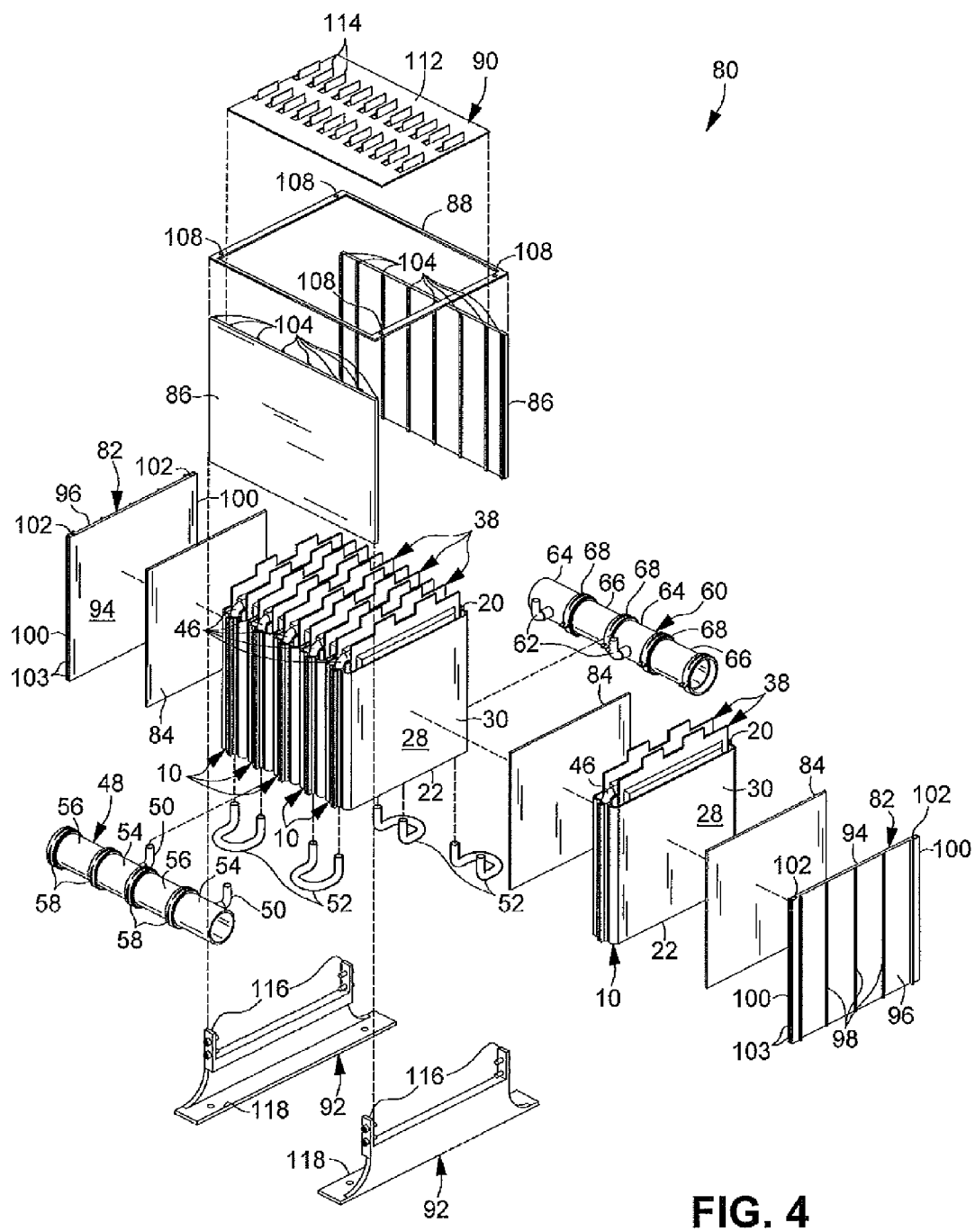
Figure 5:
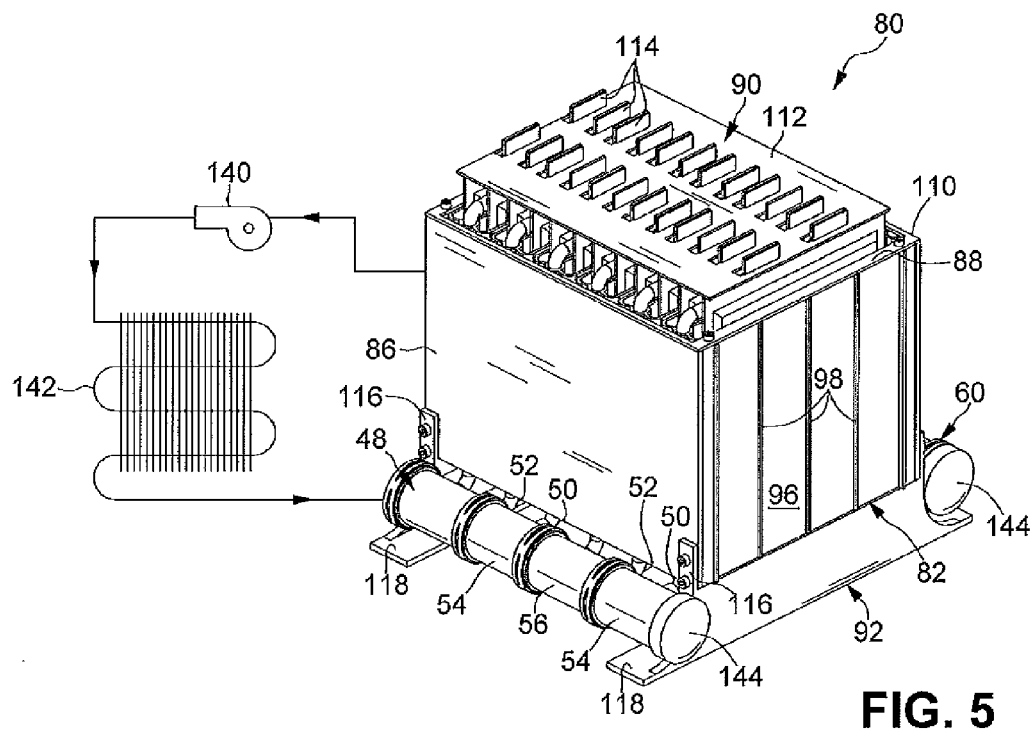
Figure 6:
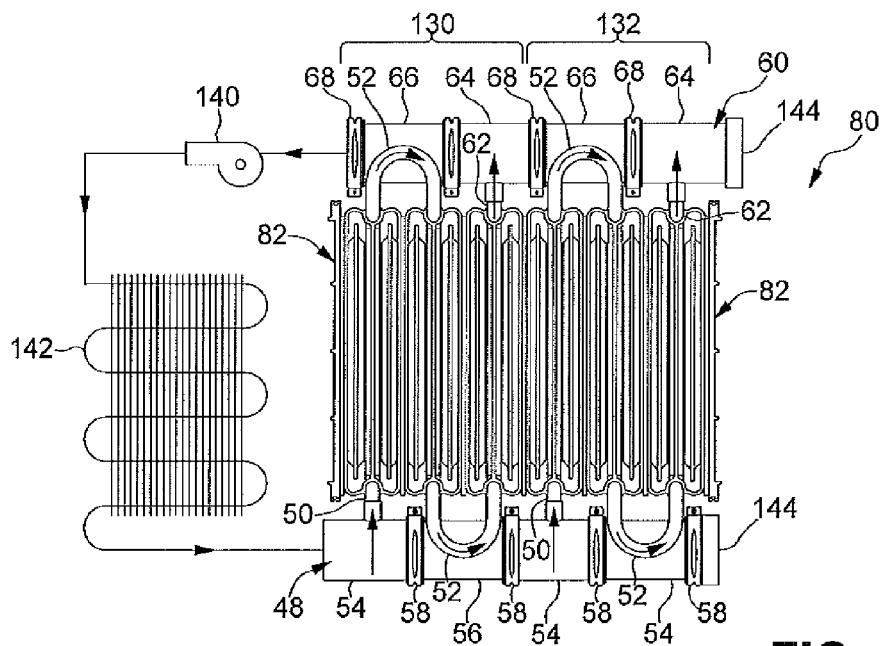

FIG, 3 is an exploded perspective view of a battery pack subassembly assembly including the main body of FIG. 1, showing a pair of battery cells, an inlet conduit in fragment, an inlet port, a transfer conduit, and an inter-body conduit;

FIG. 4 is a partially exploded perspective view of a battery pack including a plurality of the main bodies of FIG. 1, showing a battery pack subassembly, a pair of retention panels, a cell interface unit, and a pair of mounting brackets;

FIG. 5 is a perspective view of the battery pack of FIG. 4, the battery pack in communication with a thermal management system;

FIG. 6 is bottom plan view of the battery pack of FIG. 4, the pair of retention panels and a pair of mounting brackets removed for clarity.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 2:
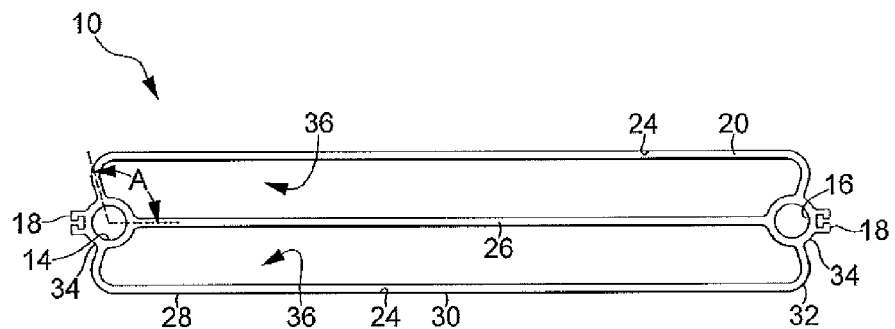
FIG. 2 is a top plan view of the main body of FIG. 1.

FIGS. 1 and 2 show a main body 10 forming a portion of a thermal management system for a battery pack according to an embodiment of the present disclosure. The battery pack may supply electric power to an associated electric device such as an electric vehicle, for example. The main body 10 includes a plurality of thermal fins, a first conduit 14, a second conduit 16, and a pair of retention channels 18. In the embodiment shown, the main body 10 is an extruded body, wherein the thermal fins, the first conduit 14, the second conduit 16, and the retention channels 18 are integrally formed therewith. The main body 10 may be formed from aluminum by extruding a billet through a die and cutting a resulting extrusion to a desired length, thereby forming a first end 20 and a second end 22. Alternately, the main body 10 may be formed from other conductive metals, such as a steel or a copper alloy and may be formed using other processes, such as machining. Further, the thermal fins, the first conduit 14, the second conduit 16, and the retention channels 18 may each be formed separate, and coupled together to form the main body 10.

The thermal fins include external thermal fins 24 and an internal thermal fin 26. The external thermal fins 24 form at least a portion of an outer surface 28 of the main body 10. The thermal fins 24, 26 include a planar portion 30 and an arcuate portion 32. As shown, the planar portion 30 is substantially rectangular and centrally positioned with respect to the main body 10, but other shapes may be used as desired.

The main body 10 shown includes two external thermal fins 24 and one internal thermal fin 26, however, the main body 10 may include any number and combination of thermal fins 24, 26. The planar portions 30 of the thermal fins 24, 26 are substantially parallel. The thermal fins 24, 26 are coupled to an outer conduit surface 34 of the first conduit 14 and the second conduit 16. In the embodiment shown, a coupling angle A formed between the thermal fins 24, 26 at the first conduit 14 and the second conduit 16 is about 120 degrees, but other angles may be used. The arcuate portions 32 formed with the external thermal fins 24 allow the thermal fins 24, 26 to be spaced apart while remaining substantially parallel, forming a battery cell retention area or enclosure 36. Alternately, the arcuate portions 32 may be linearly shaped or have other shapes as desired.

Figure 3:
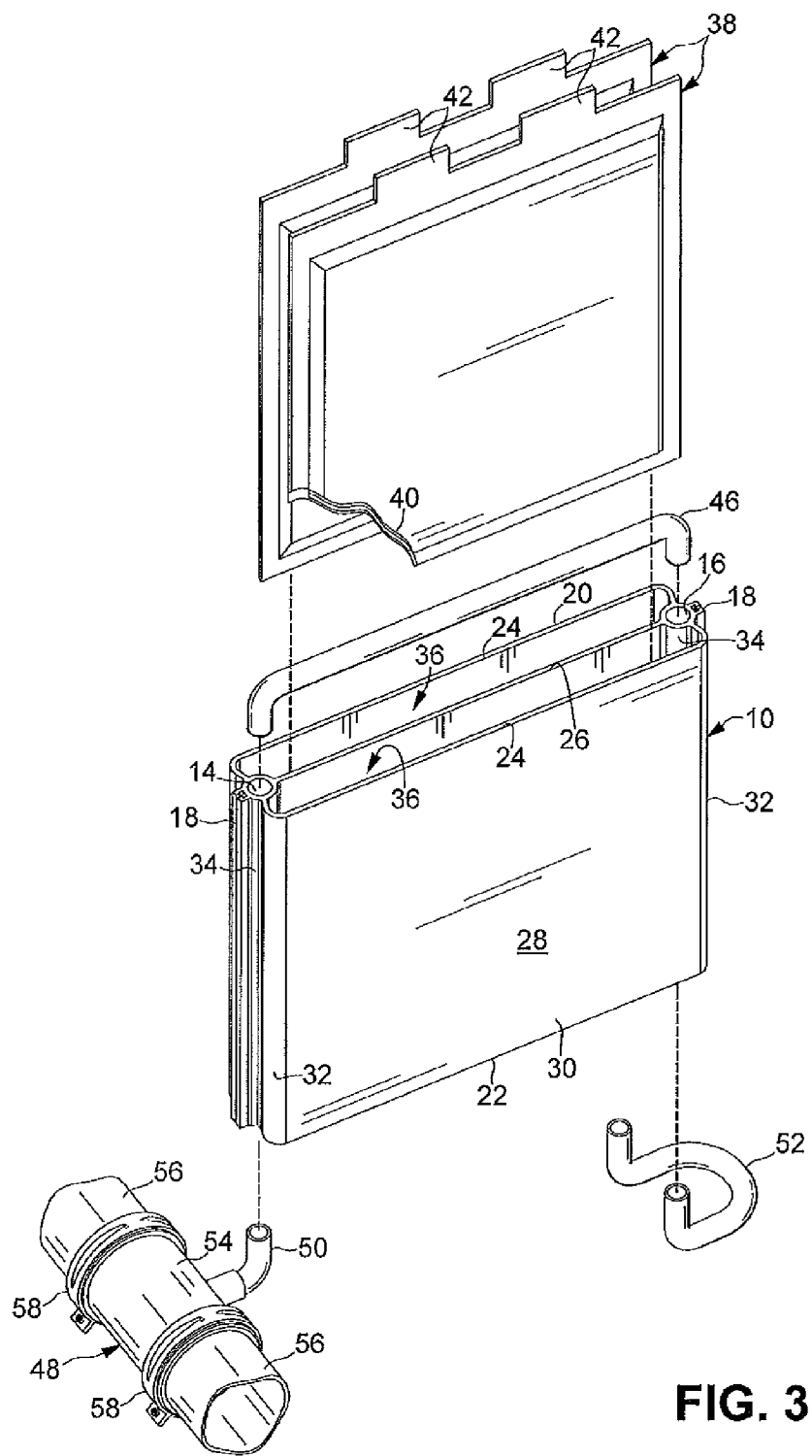

The main body 10 includes two of the battery cell retention areas 36, into which a pouch cell 38 is disposed. As shown in FIG. 3, the planar portions 30 are in facial contact with the pouch cell 38. Accordingly, the pouch cell 38 and the thermal fins 24, 26 are in heat transfer communication. As a non-limiting example, a thickness of the pouch cell 38 is about equal to a distance between the thermal fins 24, 26.

The pouch cell 38 shown is a sealed pouch containing a lithium-ion battery. Alternately, other types of battery cells may be used. The pouch cell 38 includes a battery cell 40 having a positive electrode, a negative electrode, and an electrolyte disposed therein. The positive and negative electrodes each are in electrical communication with a current collector 42. The current collectors 42 are disposed through the pouch cell 38, affording electrical communication with the electrodes of the battery cell 40.

The first conduit 14 and the second conduit 16 are conduits formed through the main body 10 during the extrusion process. The thermal fins 24, 26 terminate at the outer conduit surfaces 34 of the first conduit 14 and the second conduit 16. The conduits 14, 16 are in fluid communication with a pump or fluid source and are in heat transfer communication with the thermal fins 24, 26. Alternately, the main body 10 may be formed without the first conduit 14 and the second conduit 16, wherein the first conduit 14 and the second conduit 16 are formed by a secondary operation. As shown in FIGS. 1 and 2, the first conduit 14 and the second conduit 16 have a substantially circular cross-section, permitting a threaded connecting component to be coupled thereto when the conduits 14, 16 include a corresponding thread. Alternately, the conduits 14, 16 may be formed with polygonal, elliptical, or other cross-sectional shapes when a connecting component is soldered, brazed, or welded to the main body 10.

FIG. 3 illustrates a transfer conduit 46 in fluid communication with the first conduit 14 and the second conduit 16. The transfer conduit 46 is a rigid substantially U-shaped conduit disposed adjacent the thermal fins 24, 26. Alternately, the transfer conduit may be a flexible conduit. The transfer conduit 46 is sealingly engaged with the first conduit 14 and the second conduit 16 at the first end 20 of the main body 10 to afford fluid communication between the conduits 14, 16. Typically, the transfer conduit 46 is coupled to the main body 10 by a solder, braze, or weld, but other fasteners such as a threaded fitting may be used.

The retention channel 18 is a keyway formed in the main body adjacent the first conduit 14 and the second conduit 16, extending along a length of the main body 10. The retention channel 18 has a substantially "C" shaped cross-section. Alternately, any fastening point or portion of a fastening point such as a flanged protuberance, a bulbous protuberance, a channel, an aperture, or the like may be used in place of the retention channel 18.

FIG. 3 further illustrates an inlet conduit 48 having an inlet port 50 in fluid communication with the first conduit 14 of the main body 10 and an inter-body conduit 52 in fluid communication with the second conduit 16 of the main body 10. The inlet conduit 48 is formed from a plurality of tee portions 54 and coupling portions 56, each of the tee portions 54 sealingly engaged with the coupling portions 56. The coupling portions 56 are resilient and are secured to the tee portions 54 through the use of a band clamp 58. Alternately, the coupling portions 56 may be rigid and secured to the tee portions 54 by an adhesive, a tapered thread, or other fastener. The inlet port 50 is an elbow shaped conduit sealingly engaged with the first conduit 14 at the second end 22 of the main body 10 and the tee portion 54 of the inlet conduit 48. The inter-body conduit 52 is a substantially U-shaped conduit sealingly engaged with the second conduit 16 at the second end 22 of the main body 10. The inter-body conduit 52 affords fluid communication between each of a plurality of main bodies 10 adjacently placed in succession.

As shown in FIG. 4, an outlet conduit 60 having an outlet port 62 is in fluid communication with the second conduit 16 of the main body 10. The outlet conduit 60 is formed from a plurality of tee portions 64 and coupling portions 66, each of the tee portions 64 sealingly engaged with the coupling portions 66. The coupling portions 66 are resilient and secured to the tee portions 64 through the use of a band clamp 68. Alternately, the coupling portions 66 may be rigid and secured to the tee portions 64 by an adhesive, a tapered thread, or other fastener. The outlet port 62 is an elbow shaped conduit sealingly engaged with the second conduit 16 at the second end 22 of the main body 10 and the tee portion 64 of the outlet conduit 60.

A battery pack 80 including the thermal management system is shown in FIGS. 4 and 5. The thermal management system includes the plurality of main bodies 10 adjacently placed in succession, the inlet conduit 48 in fluid communication with at least one of the main bodies 10, a plurality of transfer conduits 46 respectively disposed on the main bodies 10, a plurality of inter-body conduits 52 respectively disposed between the main bodies 10 adjacently placed, and the outlet conduit 60 in fluid communication with at least one of the main bodies 10. In addition to the thermal management system, the battery pack 80 includes a plurality of the pouch cells 38 in the cell retention areas 36, an endplate 82, a plurality of swell compensation units 84, a retention panel 86, a coupling frame 88, a cell interface unit 90, and a mounting bracket 92. The plurality of main bodies 10, two of the endplates 86, two of the retention panels 86, and the coupling frame 88 cooperate to provide structural support for the battery pack 80.

An inner face 94 of the endplate 82 is disposed adjacent one of the main bodies 10. An outer face 96 of the endplate 82 may have a plurality of thermal management features 98 formed thereon. As illustrated, each of the thermal management features 98 is a rib extending along a length of the outer face 96, but any other type of feature may be used. At least one retention groove 100 is integrally formed in the endplate 82. The retention groove 100 is a keyway having a substantially "C" shaped cross-section. Alternately, any fastening point or portion of a fastening point such as a flanged protuberance, a bulbous protuberance, a channel, an aperture or the like may be used. At least one frame aperture 102 is formed in an end of the endplate 82 for receiving a fastener. As shown, the endplate 82 includes two of the frame apertures 102 formed in the end of the endplate 82 placed adjacent the first end 20 of the main bodies 10. At least one bracket aperture 103 is formed in the endplate 82 for receiving a fastener. As shown, the endplate 82 includes two of the bracket apertures 103 formed in the end of the endplate 82 placed adjacent the second end 22 of the main bodies 10. The battery pack 80 includes two of the endplates 82 formed from aluminum by extruding a billet through a die and cutting a resulting extrusion to a desired length. Alternately, the endplate 82 may be formed from other conductive metals, such as a steel or a copper alloy and may be formed using other processes, such as machining.

The swell compensation units 84 are disposed between each of the main bodies 10 adjacently placed in succession. The swell compensation units 84 are mats formed from a foam, an elastomer, or a spring element and shaped to substantially correspond to the planar portion 30 of the main body 10. It is understood that other resilient materials can be used to form the swell compensation units 84. Further, the swell compensation units 84 are disposed between the main bodies 10 and the endplates 82. The swell compensation units 84 may be coupled to the main bodies 10 and the endplates 82 using an adhesive. Alternately, a frictional force between the main bodies 10 and the endplates 82 is sufficient to retain a positioning of the swell compensation units 84 when the swell compensation units 84 are not coupled using an adhesive. As shown, the battery pack 80 includes seven swell compensation units 84, although additional or fewer swell compensation units 84 may be used.

A plurality of retention keys 104 corresponding to each of the retention channels 18 and the retention grooves 100 is integrally formed with the retention panel 86 on an interior face 106 thereof. Alternately, the plurality of retention keys 104 may be formed separate from the retention panel 86 and coupled thereto. Each of the retention keys 104 has a cross-sectional shape substantially corresponding to the retention channels 18 and the retention grooves 100. In the illustrated embodiment, the battery pack 80 includes two retention panels 86, each having seven retention keys 104 formed from aluminum by extruding a billet through a die and cutting a resulting extrusion to a desired length. Alternately, the retention panels 86 may be formed from other conductive metals, such as a steel or a copper alloy and may be formed using other processes, such as machining. Further, the retention panels 86 may be formed from a moldable material such as plastic using an injection molding process, an extrusion process, or other processes as desired. The retention panels 86 include a plurality of apertures formed therethrough, the apertures corresponding to the bracket apertures 103 formed in each of the endplates 82.

The coupling frame 88 is typically formed from a rigid material such as a steel or aluminum. A stamping operation may be used to form the coupling frame 88. Alternately, the coupling frame 88 may be formed from a moldable material such as plastic. A shape of the coupling frame 88 substantially corresponds to a peripheral edge 110 of the battery pack 80. The coupling frame 88 includes a plurality of frame perforations 108 formed therethrough, which correspond to the frame apertures 102 formed in the endplates 82.

The cell interface unit 90 is a rigid body disposed adjacent an end of the plurality of pouch cells 38. The cell interface unit 90 includes an insulative main body 112 and a plurality of collector terminals 114 in electrical communication with the current collectors 42 and an electrical system (not shown). The insulative main body 112 has a shape substantially corresponding to a cross-sectional shape of the plurality of main bodies 10 adjacently placed in succession. The insulative main body 112 is typically formed from a moldable material such as plastic.

The mounting bracket 92 is coupled to the endplate 82 adjacent the second end 22 of the main bodies 10. The battery pack 80, as illustrated, includes two mounting brackets 92. The mounting bracket 92 is typically formed from a rigid material such as a steel or aluminum. Alternately, the mounting bracket 92 may be formed from a plurality of components or a moldable material such as plastic. The mounting bracket 92 includes a fastening tab 116 and a base portion 118. The fastening tab includes a plurality of apertures formed therethrough. As shown, the mounting bracket 92 includes two spaced apart fastening tabs 116, each of the fastening tabs 116 having two apertures formed therethrough. A distance between the fastening tabs 116 is substantially equal to a width of the endplate 82. The apertures formed through each of the fastening tabs 116 correspond to the bracket apertures 103 formed in each of the endplates 82. The base portion 118 includes at least one aperture formed therethrough, into which a fastener is disposed for coupling the battery pack 80 to a mounting structure (not shown).

During assembly of the battery pack 80, the main bodies 10, the endplates 82, and the swell compensation units 84 are arranged in a battery pack subassembly, wherein the swell compensation units 84 are interposed between the main bodies 10 and the endplates 82. Each of the planar portions 30 of the main bodies 10 and the inner faces 94 of the endplates 82 abut the swell compensation units 84. The retention channels 18 of each of the main bodies 10 and the retention grooves 100 of the endplates are aligned in a substantially parallel fashion for receiving the retention keys 104 of each of the retention panels 86. A force may be applied to the endplates 82 to compress the swell compensation units 84. The retention keys 104 are disposed in the retention channels 18 and the retention grooves 100, coupling the retention panels 86 to the main bodies 10 and the endplates 82. An adhesive or a plurality of fasteners may be used to couple the main bodies 10 and the endplates 82 to the retention panels 86. After the retention panels 86 are coupled to the plurality of main bodies 10 and the endplates 82, the coupling frame 88 is abuttingly disposed against the endplates 82, the first ends 20 of the main bodies 10, and the retention panels 86. The frame perforations 108 are aligned with the frame apertures 102 of the endplates 86 and a plurality of fasteners is disposed therethrough to fasten the coupling frame 88 to the endplates 86.

Following assembly of the battery pack subassembly, the transfer conduits 46, the inlet ports 50, the inter-body conduits 52, and the outlet ports 62 are coupled to respective ones of the first conduit 14 and the second conduit 16 of the main bodies 10. As illustrated in FIGS. 4, 5, and 6, the inlet ports 50, the inter-body conduits 52, and the outlet ports 62 are coupled to the first conduit 14 and the second conduit 16 to form a first branch 130 and a second branch 132. The first branch 130 and the second branch 132 are parallel circuits with respect to the inlet conduit 48 and the outlet conduit 60. The first branch 130 and the second branch 132 each include three main bodies 10 in a series configuration, each of the branches 130, 132 containing three transfer conduits 46, two inter body conduits 52, an inlet port 50, and an outlet port 62. It is understood that the first conduit 14 and the second conduit 16 may be configured with the transfer conduits 46, the inlet ports 50, the inter-body conduits 52, and the outlet ports 62 in any manner to accommodate a thermal management need of the battery pack 80. It is further understood that any number of main bodies can be included in the branches 130, 132 as desired, and that any number of branches 130, 132 can be used as desired.

After the transfer conduits 46, the inlet ports 50, the inter-body conduits 52, and the outlet ports 62 are coupled to the main bodies 10 and at least one of the pouch cells 38. As illustrated, the battery pack 80 includes twelve cell retention areas 36 into which twelve pouch cells 38 are disposed. A frictional force between the thermal fins 24, 26 and the pouch cells 38 may retain the pouch cells 38 within the cell retention areas 36. Alternately, a cell retention panel (not shown) may be disposed adjacent the second distal ends 22 of the plurality of main bodies 10 to retain the pouch cells 38 within the cell retention areas 36.

After the pouch cells 38 are disposed in the cell retention areas 36, the cell interface unit 90 is disposed adjacent the first ends 20 of the plurality of main bodies 10. The current collectors 42 are coupled to the collector terminals 114 using a plug style connection, but other fastening means such as a solder may be used.

The mounting brackets 92 are then coupled to the battery pack 80. The apertures formed through each of the fastening tabs 116 are aligned with the apertures formed in the retention panels 86 and the bracket apertures 103 formed in the endplates 86. A plurality of fasteners is then disposed through the apertures formed through the fastening tabs 116 to fasten the mounting brackets 92 to the battery pack 80.

After the cell interface unit 90 and the mounting brackets 92 are coupled to the battery pack 80, the battery pack 80 is disposed on a support structure (not shown). The support structure may be a portion of a vehicle or any other structure. A plurality of fasteners is disposed through the apertures formed through the base portion 118 to fasten the battery pack 80 to the support structure. Following fastening of the battery pack 80 to the support structure, the inlet conduit 48 and the outlet conduit 60 are coupled to the inlet ports 50 and the outlet ports 62.

As illustrated in FIGS. 5 and 6, the plurality of main bodies 10, the inlet conduit 48, and the outlet conduit 60 are in fluid communication with a source of fluid forming a coolant loop including a pump 140 and a heat exchanger 142. A conduit cap 144 is sealingly disposed on an end of each of the inlet conduit 48 and the outlet conduit 60. The plurality of main bodies 10, the transfer conduits 46, the inlet ports 50, the inter-body conduits 52, the outlet ports 62, the inlet conduit 48, the outlet conduit 60, the pump 140, and the heat exchanger 142 form a thermal management system for the battery pack 80.

The pump 140 is a fluid transfer pump as is known in the art, wherein the pump 140 transfers the fluid through the coolant loop and the battery pack 80. As shown, the pump 140 is disposed adjacent the outlet conduit 60, but the pump 140 may be disposed at any location. The pump 140 is in electrical communication with a controller (not shown), the controller receiving information from at least one temperature sensor or other sensor type to control an operation thereof. The heat exchanger 142 is a heat exchanger as is known in the art. As shown, the heat exchanger 142 shown is a liquid to air heat exchanger, including a primary conduit passing in an undulating manner through a plurality of conductive sheets, but any type of heat exchanger may be used. The primary conduit is in fluid communication with the inlet conduit 48 and the outlet conduit 60.

In use, the battery pack 80 including the thermal management system is used to regulate the temperature of the battery pack 80. During a charging cycle, a discharging cycle, or a period of inactivity of the battery pack 80, a temperature of the battery pack 80 may increase or decrease undesirably. An undesirable increase or decrease in battery pack temperature may result from an external factor (such as an ambient temperature) or an internal factor (such as the charging cycle).

A change in temperature of the battery pack 80 is detected by the temperature sensor. Upon the battery pack 80 reaching a threshold temperature, the controller activates the pump 140. A fluid in the thermal management system is circulated by the pump 140. The fluid entering the first branch 130 and the second branch 132 through the inlet conduit 48 in fluid communication with the supply conduit 38 flows through the inlet ports 50, the first conduits 14, the transfer conduits 46, the second conduits 16, and the inter-body conduits 52, ultimately leaving the first branch 130 and the second branch 132 through the outlet ports 62 in fluid communication with the outlet conduit 60.

When the battery pack 80 has an elevated temperature, the fluid leaving the battery pack 80 in the outlet conduit 60 has a higher temperature than the fluid entering the battery pack 80 in the inlet conduit 48. After entering the heat exchanger 142, heat in the fluid is transferred to a fluid surrounding the heat exchanger 142 and removed from the thermal management system. A temperature of the fluid surrounding the heat exchanger 142 may be controlled by a vehicle cooling system, a refrigeration system, or a fluid reservoir, for example. The fluid exits the heat exchanger 142 at a lower temperature and is recirculated through the thermal management system. The thermal management system continues to operate in this manner until the temperature of the battery pack 80 is lowered to a desired temperature and detected by the temperature sensor and operation of the pump 140 is stopped by the controller.

When the battery pack 80 has a temperature lower than desired, the thermal management system can also be used to heat the battery pack 80. In this case, the fluid leaving the battery pack 80 in the outlet conduit 60 has a lower temperature than the fluid entering the battery pack 80 in the inlet conduit 48. After entering the heat exchanger 142, heat in the fluid surrounding the heat exchanger 142 is transferred to the fluid and into the thermal management system. A temperature of the fluid surrounding the heat exchanger 142 may be controlled by a vehicle heating system, a heater, or a fluid reservoir, for example. The fluid exits the heat exchanger 142 at a higher temperature and is recirculated through the thermal management system. The thermal management system continues to operate in this manner until the temperature of the battery pack 80 is raised to a desired temperature and detected by the temperature sensor and operation of the pump 140 is stopped by the controller.

While certain representative embodiments and details have been shown for purposes of illustrating the invention, it will be apparent to those skilled in the art that various changes may be made without departing from the scope of the disclosure, which is further described in the following appended claims.

What is claimed is:

1. A thermal management system for a battery pack:
   at least one battery cell; and
   a main body having a battery cell retention area formed between a plurality of thermal fins and a first conduit in fluid communication with a source of a fluid, the first conduit in thermal communication with the thermal fins, at least one of the plurality of thermal fins forms at least a portion of an outer surface of the main body, wherein the at least one battery cell is received in the battery cell retention area to place the thermal fins in thermal communication with the at least one battery cell, and wherein the fluid is caused to flow through the first conduit and cooperates with the first conduit and the thermal fins to regulate a temperature of the at least one battery cell.

2. The thermal management system according to claim 1, wherein the first conduit is coupled to the thermal fins.

3. The thermal management system according to claim 1, wherein the first conduit is integrally formed with the thermal fins.

4. The thermal management system according to claim 3, wherein the main body is formed by an extrusion process.

5. The thermal management system according to claim 1, further comprising a retention channel formed on the first conduit of the main body for mounting the main body.

6. The thermal management system according to claim 1, wherein the thermal fins have a substantially planar portion, the planar portion of at least one of the thermal fins abutting the at least one battery cell.

7. The thermal management system according to claim 1, further comprising:
   a second conduit in fluid communication with the source of a fluid, the second conduit spaced from the first conduit and in thermal communication with the thermal fins; and
   a transfer conduit providing fluid communication between the first conduit and the second conduit, wherein the fluid is caused to flow from the source of fluid through the first conduit, the transfer conduit, and the second conduit, and to the source of fluid, the fluid cooperating with the first conduit, the second conduit, and the thermal fins to regulate a temperature of the at least one battery cell.

8. The thermal management system according to claim 1, further comprising a swell compensation unit disposed adjacent the main body.

9. A thermal management system for a battery pack comprising:
   a plurality of battery cells;
   a plurality of main bodies disposed in a stack, each of the main bodies having a pair of battery cell retention areas formed therein between a plurality of thermal fins, a first conduit in thermal communication with the thermal fins, and a second conduit in thermal communication with the thermal fins, wherein the battery cells are received in the battery cell retention areas to place the thermal fins in thermal communication with the battery cells;
   an inlet conduit providing fluid communication between at least one of the first conduits and a source of fluid;
   an outlet conduit providing fluid communication between at least one of the second conduits and the source of fluid; and
   a plurality of transfer conduits, one of the transfer conduits disposed between the first conduit and the second conduit of the main bodies to provide fluid communication between the first conduit and the second conduit, wherein the fluid is caused to flow from the source of fluid through the inlet conduit, the at least one of the first conduits, the transfer conduit, the at least one of the second conduits, the outlet conduit, and to the source of fluid, the fluid cooperating with the at least one of the first conduits, the at least one of the second conduits, and the thermal fins to regulate a temperature of the battery cells.

10. The thermal management system according to claim 9, wherein the thermal fins of each of the main bodies is integrally formed with the first conduit and the second conduit thereof.

11. The thermal management system according to claim 9, wherein the first conduit and the second conduit of each of the main bodies are coupled to the thermal fins thereof.

12. The thermal management system according to claim 9, wherein the first conduit and the second conduit of each of the main bodies are integrally formed with the thermal fins thereof.

13. The thermal management system according to claim 12, wherein the main body is formed by an extrusion process.

14. The thermal management system according to claim 9, further comprising a retention channel formed on each of the first conduit and the second conduit of each of the main bodies for mounting the main bodies.

15. The thermal management system according to claim 9, wherein the thermal fins have a substantially planar portion, the planar portion of at least one of the thermal fins of each main body abutting at least one of the battery cells.

16. The thermal management system according to claim 15, wherein the thermal fins have an arcuate portion formed between the planar portion and at least one of the first conduit and the second conduit.

17. The thermal management system according to claim 9, further comprising a swell compensation unit disposed adjacent at least one of the main bodies.

18. The thermal management system according to claim 9, further comprising a swell compensation unit disposed between each of adjacent ones of the main bodies.

19. The thermal management system according to claim 9, wherein the first conduit and the second conduit of each of the main bodies are substantially parallel with the battery cell retention area formed therein.

20. A thermal management system for a battery pack comprising:
   a plurality of battery cells;
   a plurality of extruded main bodies disposed in a stack, each of the main bodies having a pair of battery cell retention areas formed therein between a plurality of thermal fins, a first conduit in thermal communication with the thermal fins, and a second conduit in thermal communication with the thermal fins, wherein the first conduit and the second conduit of each of the main bodies are integrally formed with the thermal fins thereof, and wherein the battery cells are received in the battery cell retention areas to place the thermal fins in thermal communication with the battery cells;
   a swell compensation unit disposed between each of the main bodies;
   an inlet conduit providing fluid communication between at least one of the first conduits and a source of fluid;
   an outlet conduit providing fluid communication between at least one of the second conduits and the source of fluid; and
   a plurality of transfer conduits, one of the transfer conduits disposed between the first conduit and the second conduit of the main bodies to provide fluid communication between the first conduit and the second conduit, wherein the fluid is caused to flow from the source of fluid through the inlet conduit, the at least one of the first conduits, the transfer conduit, the at least one of the second conduits, the outlet conduit, and to the source of fluid, the fluid cooperating with the at least one of the first conduits, the at least one of the second conduits, and the thermal fins to regulate a temperature of the battery cells.

* * * * *